(12) United States Patent
Xu et al.

(10) Patent No.: US 11,381,963 B2
(45) Date of Patent: Jul. 5, 2022

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Yang Xu, Guangdong (CN); Shukun Wang, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/220,800

(22) Filed: Apr. 1, 2021

(65) Prior Publication Data
US 2021/0227385 A1 Jul. 22, 2021

Related U.S. Application Data

(63) Continuation of application No. PCT/CN2018/110289, filed on Oct. 15, 2018.

(51) Int. Cl.
*H04W 12/04* (2021.01)
*H04W 80/00* (2009.01)
(52) U.S. Cl.
CPC ........... *H04W 12/04* (2013.01); *H04W 80/00* (2013.01)
(58) Field of Classification Search
CPC ......... H04W 36/0038; H04W 36/0069; H04W 36/02; H04W 36/18; H04W 80/00; H04W 80/02; H04W 12/037; H04W 12/04; H04W 12/37; H04W 40/36; H04W 88/02; H04W 12/03; H04W 12/106; H04W 28/06; H04W 88/06; H04W 12/033; H04W 12/10
See application file for complete search history.

(56) References Cited

U.S. PATENT DOCUMENTS

| 7,774,594 | B2 | 8/2010 | Lopez |
| 8,032,746 | B2 | 10/2011 | Boppana |
| 8,274,938 | B2 | 9/2012 | Chang |
| 9,380,642 | B2 | 6/2016 | Periyalwar |
| 9,392,496 | B2 | 7/2016 | Low et al. |
| 10,069,947 | B2 | 9/2018 | Yang et al. |
| 10,986,549 | B2 | 4/2021 | Wang et al. |

(Continued)

FOREIGN PATENT DOCUMENTS

| CN | 101048001 A | 10/2007 |
| CN | 101902834 A | 12/2010 |

(Continued)

OTHER PUBLICATIONS

International Search Report in the international application No. PCT/CN2018/110289, dated Jun. 24, 2019.

(Continued)

*Primary Examiner* — Joseph E Dean, Jr.
(74) *Attorney, Agent, or Firm* — Perkins Coie LLP

(57) ABSTRACT

A wireless communication method and device are provided. The method comprises operations as follows. A transmitted first data packet is processed by using a first key through a first protocol stack. A transmitted second data packet is processed by using a second key through a second protocol stack. The first protocol stack and the second protocol stack share at least one protocol layer.

14 Claims, 15 Drawing Sheets

(56) References Cited

U.S. PATENT DOCUMENTS

| | | | |
|---|---|---|---|
| 2007/0028090 | A1 | 2/2007 | Lopez |
| 2008/0317002 | A1 | 12/2008 | Boppana |
| 2010/0304782 | A1 | 12/2010 | Chang |
| 2012/0177002 | A1 | 7/2012 | Faucher |
| 2012/0218973 | A1 | 8/2012 | Du |
| 2014/0248862 | A1 | 9/2014 | Periyalwar |
| 2014/0269763 | A1 | 9/2014 | Gantman et al. |
| 2014/0274065 | A1 | 9/2014 | Low et al. |
| 2015/0312382 | A1 | 10/2015 | Gantman et al. |
| 2015/0358813 | A1 | 12/2015 | Lee et al. |
| 2016/0191471 | A1 | 6/2016 | Ryoo et al. |
| 2016/0286472 | A1 | 9/2016 | Periyalwar et al. |
| 2016/0337483 | A1 | 11/2016 | Yang et al. |
| 2018/0020456 | A1 | 1/2018 | Wan et al. |
| 2018/0098250 | A1* | 4/2018 | Vrzic ............... H04W 36/0016 |
| 2018/0160303 | A1 | 6/2018 | Lee et al. |
| 2018/0183767 | A1 | 6/2018 | Ryoo et al. |
| 2018/0324651 | A1 | 11/2018 | Tenny et al. |
| 2019/0069333 | A1 | 2/2019 | Kim |
| 2019/0089682 | A1 | 3/2019 | Ryoo et al. |
| 2019/0320476 | A1 | 10/2019 | Wang et al. |
| 2019/0342800 | A1 | 11/2019 | Sirotkin |
| 2019/0386965 | A1 | 12/2019 | Ryoo et al. |
| 2020/0022032 | A1 | 1/2020 | Tenny et al. |
| 2020/0076774 | A1 | 3/2020 | Ryoo et al. |
| 2020/0195620 | A1 | 6/2020 | Ryoo et al. |
| 2020/0404553 | A1* | 12/2020 | Lovlekar ............... H04W 36/02 |
| 2021/0014764 | A1 | 1/2021 | Zhang et al. |
| 2021/0014893 | A1 | 1/2021 | Park |

FOREIGN PATENT DOCUMENTS

| | | |
|---|---|---|
| CN | 102123457 A | 7/2011 |
| CN | 103096303 A | 5/2013 |
| CN | 104661270 A | 5/2015 |
| CN | 105101164 A | 11/2015 |
| CN | 105144784 A | 12/2015 |
| CN | 105407461 A | 3/2016 |
| CN | 106332155 A | 1/2017 |
| CN | 104811431 B | 1/2018 |
| CN | 108306915 A | 7/2018 |
| EP | 1748615 A1 | 1/2007 |
| KR | 20130118945 A | 10/2013 |
| RU | 2568679 C1 | 11/2015 |
| RU | 2608241 C2 | 1/2017 |
| WO | 2013016797 A1 | 2/2013 |
| WO | 2016140757 A1 | 9/2016 |
| WO | 2018019358 A1 | 2/2018 |
| WO | 2018201985 A1 | 11/2018 |

OTHER PUBLICATIONS

First Office Action of the Japanese application No. 2019-567262, dated Jul. 16, 2021. 8 pages with English translation.

OPPO: "Discussion on mobility enhancement in LTE", 3GPP Draft; R2-1813794; vol. RAN WG2, No. Chengdu, China; Oct. 8, 2018-Oct. 12, 2018 Sep. 28, 2018 (Sep. 28, 2018), XP051523284. 3 pages.

Apple Inc: "Key Change in DC based HO", 3GPP Draft: R2-1814584; vol. RAN WG2, No. Chengdu, China; Oct. 8, 2018-Oct. 10, 2018 Sep. 28, 2018 (Sep. 28, 2018), XP051524009. 3 pages.

Supplementary European Search Report in the European application No. 18937333.5, dated Aug. 12, 2021.10 pages.

Notice of Allowance of the U.S. Appl. No. 16/623,853, dated Aug. 11, 2021. 15 pages.

First Office Action of the U.S. Appl. No. 16/623,853, dated Apr. 26, 2021.

International Search Report in the international application No. PCT/CN2017/094335, dated Apr. 12, 2018.

Written Opinion of the International Search Authority in the international application No. PCT/CN2017/094335, dated Apr. 12, 2018.

ZTE Corporation: "Discussion on data forwarding in mobility enhancement solutions", 3GPP Draft; R3-161144 Discussion on Data Forwarding in Mobility Enhancement Solutions V2, 3rd Generation Partnership Project (3GPP), Mobile Competence Centre; 650, Route Des Lucioles ; F-06921 Sophia, vol. RAN WG3, No. Nanjing, China; May 23, 2016-May 27, 2016 May 22, 2016 (May 22, 2016), XP051105948.

Huawei et al: "Comparison of 0ms interruption solutions", 3GPP Draft; R2-1706707 Comparison of 0MS Interruption Solutions, 3rd Generation Partnership Project (3GPP), Mobile Competence Centre; 650, Route Des Lucio les; F-06921 Sophia-Anti Polis Cedex France, vol. RAN WG2, No. Qingdao, China; Jun. 27, 2017-Jun. 29, 2017 Jun. 26, 2017 (Jun. 26, 2017), XP051301207.

CAT: "Discussion on data forwarding for make before break solution", 3GPP Draft; R3-161152, 3rd Generation Partnership Project (3GPP), Mobile Competence Centre; 650, Route Des Lucioles; F-06921 Sophia-Antipolis Cedex France, vol. RAN WG3, No. Nanjing, China; May 23, 2016-May 27, 2016 May 22, 2016 (May 22, 2016), XP051105956.

Supplementary European Search Report in the European application No. 17919528.4, dated May 12, 2020.

3GPP TSG-RAN WG2 #98 Tdoc, R2-1704434, Ericsson, "0 ms support during handover procedure in NR", mailed on May 9, 2017.

3GPP TSG-RSN WG2 Meeting #98, R2-1704529, MediaTek Inc, "Mobility Enhancement for '0ms Interruption' HO", mailed on May 9, 2017.

3GPP TSG-RAN WG2 #98, R2-1704853, Huawei, HiSilicon, "SgNB to MgNB reconfiguration for 0ms interruption handover", mailed on May 9, 2017.

3GPP TSG-RAN2 #98, R2-1704855, Huawei, HiSilicon, "DC operation for robust handover", mailed on May 9, 2017.

Notice of Allowance of the Russian application No. 2019144782, dated Nov. 17, 2020.

First Office Action of the Canadian application No. 3066655, dated Feb. 12, 2021.

Office Action of the Indian application No. 201917053985, dated Apr. 27, 2021.

Ericsson; "0 ms interruption support during handover procedure in NR", 3GPP TSG-RAN WG2 NR AH#2 Tdoc R2-1706625, Qingdao, China, Jun. 27-29, 2017.

First Office Action of the Korean application No. 10-2019-7035311, dated May 4, 2021.

First Office Action of the European application No. 17919528.4, dated May 28, 2021.

Written Opinion of the Singaporean application No. 11201912337T, dated Jun. 22, 2021.

Second Office Action of the Canadian application No. 3066655, dated Nov. 17, 2021. 7 pages.

First Office Action of the Canadian application No. 3115390, dated Mar. 24, 2022. 3 pages.

First Office Action of the Chinese application No. 202110310332.X, dated Apr. 6, 2022. 19 pages with English translation.

First Office Action of the Russian application No. 2021113109, dated Apr. 15, 2022. 13 pages with English translation.

Office Action of the Indian application No. 202117018034, dated Feb. 14, 2022. 6 pages with English translation.

First Office Action of the European application No. 18937333.5, dated Apr. 26, 2022. 7 pages.

* cited by examiner

300

| A data packet sender sends a first identifier to a data packet receiver, and the first identifier is configured to distinguish data packets processed by using a first key and a second key | — 310 |

A data packet receiver receives a first identifier sent by a data packet sender, and the first identifier is configured to distinguish data packets processed by using a first key and a second key ⸺ 410

WIRELESS COMMUNICATION METHOD AND DEVICE

CROSS-REFERENCE TO RELATED APPLICATIONS

This is a continuation application of International Patent Application No. PCT/CN2018/110289, filed on Oct. 15, 2018, the disclosure of which is hereby incorporated by reference in its entirety.

BACKGROUND

For a user-plane protocol stack and a control-plane protocol stack, each of a base station side and a terminal side corresponds to a Packet Data Convergence Protocol (PDCP) layer, a Radio Link Control (RLC) layer, a Media Access Control (MAC) layer and a Physical (PHY) layer. For a user plane, a Service Data Adaptation Protocol (SDAP) layer is above the PDCP layer. For a control plane, a Radio Resource Control (RRC) layer is above the PDCP layer.

The PDCP layer is mainly configured to perform encryption and integrity protection using a key.

The key is required to be updated, and consequently, inconsistency may be caused in a period of time, that is, a sender uses a new key and a receiver uses an old key, which results in a transmission failure or a decryption failure.

SUMMARY

The embodiments of the disclosure relate to the technical field of communication, and particularly to a wireless communication method and device, which can distinguish keys used for a data packet, and enable a receiver and a data packet sender to process the same data packet using the same key.

A first aspect of the embodiments provides a wireless communication method, which may include operations as follows. A transmitted first data packet is processed by using a first key through a first protocol stack, and a transmitted second data packet is processed by using a second key through a second protocol stack. The first protocol stack and the second protocol stack share at least one protocol layer.

A second aspect of the embodiments provides a communication device, which may include a processor and a memory. The memory may be configured to store a computer program, and the processor may be configured to call and run the computer program stored in the memory to: process a transmitted first data packet by using a first key through a first protocol stack; and process a transmitted second data packet by using a second key through a second protocol stack. The first protocol stack and the second protocol stack share at least one protocol layer.

BRIEF DESCRIPTION OF THE DRAWINGS

FIG. 7 is a schematic flowchart of a wireless communication method according to an embodiment of the disclosure.

FIG. 9 is a schematic flowchart of a wireless communication method according to an embodiment of the disclosure.

DETAILED DESCRIPTION

The technical solutions in the embodiments of the disclosure are described below in combination with the drawings in the embodiments of the disclosure. Apparently, the described embodiments are only a part rather than all of the embodiments of the disclosure. All other embodiments obtained by those skilled in the art on the basis of the embodiments in the disclosure without paying creative work fall within the scope of protection of the disclosure.

The technical solutions of the embodiments of the disclosure may be applied to various communication systems such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a 5th-Generation (5G) system.

Figure 1:
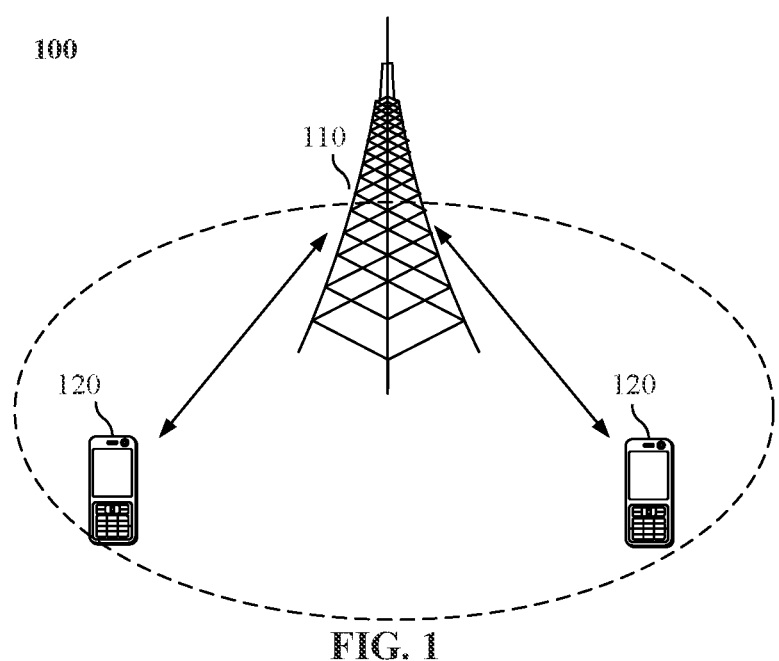
FIG. 1 is a schematic diagram of architecture of a communication system according to an embodiment of the disclosure.

Exemplarily, a communication system 100 in the embodiments of the disclosure may be illustrated in FIG. 1 and may include a base station 110. The base station 110 may be a device communicating with a terminal device 120 (or referred to as a communication terminal or a terminal). The base station 110 may provide communication coverage for a particular geographical area and communicate with a terminal device located in the coverage. Optionally, the base station 110 may be a base station (a Base Transceiver Station (BTS)) in a GSM system or a CDMA system, a base station (a NodeB (NB)) in a WCDMA system, an evolutional base station (an Evolutional Node B (eNB or eNodeB)) in an LTE system, a wireless controller in a Cloud Radio Access Network (CRAN). Alternatively, the network device may be a mobile exchange center, a relay station, an access point, an on-board device, a wearable device, a hub, a switch, a bridge, a router, a network side device in a 5G network, a network device in a future evolutional Public Land Mobile Network (PLMN) or the like.

The communication system 100 further includes at least one terminal device 120 in the coverage of the network device 110. The terminal device used herein includes but is not limited to be connected via a wired line such as a Public Switched Telephone Network (PSTN), a Digital Subscriber Line (DSL), a digital cable, a direct cable, and/or via another data connection or network, and/or via a wireless interface such as a cellular network, a wireless local area network (WLAN), a digital television network like a Digital Video Broadcasting-Handheld (DVB-H) network, a satellite network, an Amplitude Modulation-Frequency Modulation (AM-FM) broadcasting transmitter, and/or via a device, which is configured to receive/send a communication signal, of another terminal device and/or an Internet of Things (IoT) device. The terminal device configured to communicate through the wireless interface may be referred to as "a wireless communication terminal", "a wireless terminal" or "a mobile "terminal". Examples of a mobile terminal include, but are not limited to, a satellite or cellular telephone, a personal communication system (PCS) terminal capable of combining a cellular radio telephone and data processing, faxing and data communication capabilities, a personal digital assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device having a wireless communication function, a computing device, another processing device connected to a wireless modem, an on-board device, a wearable device, a terminal device in the 5G network, a terminal device in the future evolved PLMN or the like.

Optionally, the 5G system or the 5G network may also be called a New Radio (NR) system or an NR network.

Optionally, the communication system 100 may further include another network entity such as a network controller and a mobility management entity (for example, an Access and Mobility Management Function (AMF) entity), which is not limited in the embodiments of the disclosure.

It should be understood that the terms "system" and "network" herein are often used interchangeably herein. The term "and/or" herein only represent an association relationship of associated objects, which means that there may be three relationships. For example, A and/or B can mean: only A exists, both A and B exist, and only B exists. In addition, the character "/" herein generally indicates that there is an "or" relationship between two associated objects.

Figure 2:
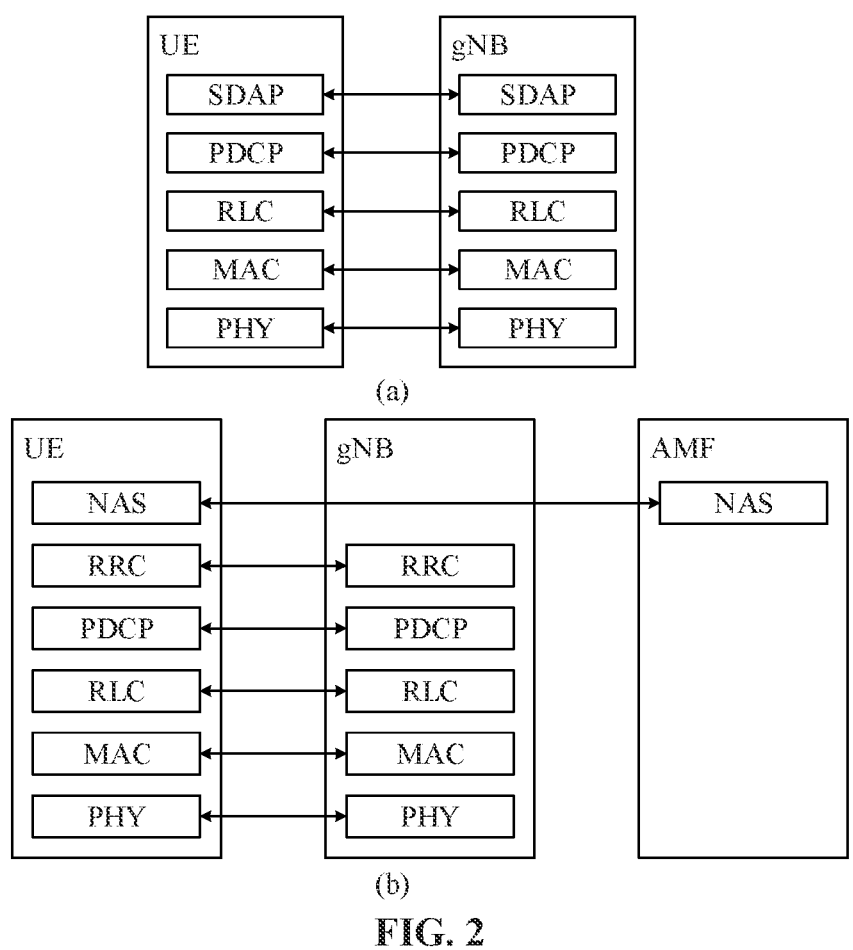
FIG. 2 is a schematic diagram of a protocol stack according to an embodiment of the disclosure.

As shown in FIG. 2, for a user-plane protocol stack (as shown by (a) in FIG. 2) and a control-plane protocol stack (as shown by (b) in FIG. 2), each of a base station side and a terminal side corresponds to a PDCP layer, an RLC layer, a MAC layer and a PHY layer. For a user plane, an SDAP layer is above the PDCP layer. For a control plane, an RRC layer is above the PDCP layer. The control-plane protocol stack further includes a Non-Access Stratum (NAS) layer of each of the terminal side and a core network (AMF) side.

The PDCP layer is mainly configured for encryption and/or integrity protection as well as ordering of data packets (which may also be RRC messages). For ensuring that received data packets can be ordered, a parameter of Sequence Number (SN) is introduced to the PDCP layer. Each data packet may correspond to an SN, which is configured to order the data packets.

An SN may be a number with a certain size of bits (for example, 32 bits). Every time when a data packet is transmitted, a value of the SN may be increased by 1. The value of the SN, when being increased to an upper limit, may be zeroed. After the SN reaches a maximum value, a new key may be generated for use.

For convenient understanding, a key is introduced below. It is to be understood that the following introduction may be specific implementation of the disclosure but should not form particular limits to the disclosure.

A purpose of Access Stratum (AS) security is for ensuring that an RRC message of the control plane and a data packet of the user plane between UE and a gNB are securely transmitted by using an AS security key. The AS security key may be calculated based on an initial key (K-gNB), and every time when a new radio link is established, a new key may be generated. After establishment of AS security is completed, the UE and the gNB may share an RRC integrity key (K-RRCinc), an RRC encryption key (K-RRCenc) and a user encryption key (K-UPenc). Encryption and integrity protection using these keys may be executed in the PDCP layer. The RRC integrity key (K-RRCinc) and the RRC encryption key (K-RRCenc) may be configured to ensure transmission security of an RRC message transmitted through a Signal Radio Bearer (SRB) on a control plane in a radio link. Before the RRC message is sent, integrity protection using the K-RRCinc and encryption using the K-RRCenc are implemented in the PDCP layer. The K-UPenc is configured for secure transmission of a data packet transmitted through a Data Radio Bearer (DRB) on a user plane in the radio link. Before the data packet is transmitted, encryption using the K-UPenc is implemented in the PDCP layer.

Once negotiation about the AS security key is completed, encryption and integrity protection are performed on all the RRC messages subsequently transmitted between the UE and the base station before sending the RRC messages, and the data packets of the user plane may also be encrypted.

Figure 3:
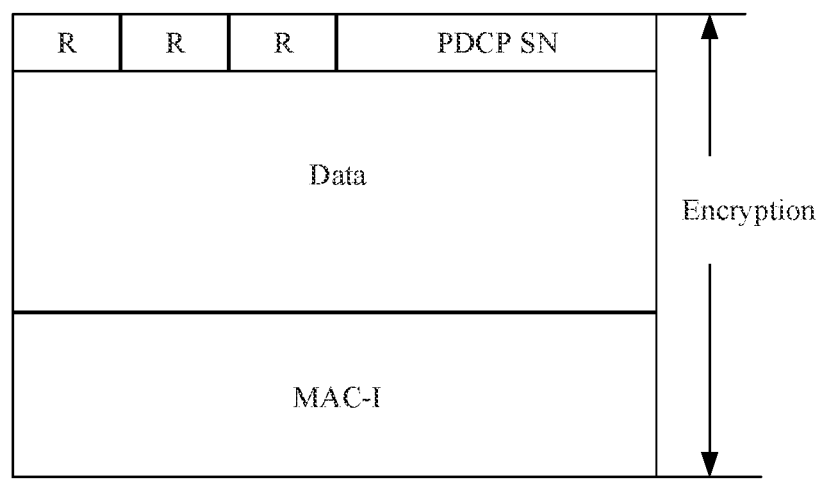
FIG. 3 is a schematic diagram of data packet processing according to an embodiment of the disclosure.

Before the RRC message is sent, integrity protection may be performed and then encryption is performed, and the message is sent. The original message includes a Message Authentication Code-Integrity (MAC-I) calculated based on the K-RRCint for integrity protection, and then is encrypted by using the K-RRCenc, and all the messages are sent after encryption and integrity protection. For example, as shown in FIG. 3, the SN may be carried in the PDCP layer, and a bit R may carry other information.

For a receiver, when the RRC message is received, decryption is performed at first and then integrity protection verification is performed. This is an inverse process of a sending process. The RRC message subjected to integrity protection is decrypted at first by using the K-RRCenc, and then bit data calculated by using the K-RRCinc is compared with the received MAC-I to check the integrity of the RRC message, so as to verify that the original RRC message is obtained.

After an SN reaches a maximum value, it is necessary to generate a new key for use. Specifically, a new K-gNB key is generated, and then an encryption and integrity protection key of the user plane is derived from the K-gNB for use.

Consequently, inconsistency may be caused in a period of time, that is, a sender uses a new key and a receiver uses an old key. For example, if there are data packets 1, 2, 3, 4, 5 and 6, an old key is used for encryption/integrity protection of data packets 1, 2 and 3 while a new key is used for encryption/integrity protection of data packets 4, 5 and 6, which may cause the following problem: after the data packets 1, 2 and 3 are received, the receiver does not know that the new key is used from the data packet 4 and may still perform decryption and integrity protection check using the old key, and consequently, transmission failure occurs or incorrectly-decrypted data content is transmitted to an upper layer.

Therefore, the embodiments of the disclosure provide the following wireless communication methods 200 and 300, which can solve the problem of transmission failure caused by the fact that a key used by a sender is different from a key used by a receiver.

Figure 4:
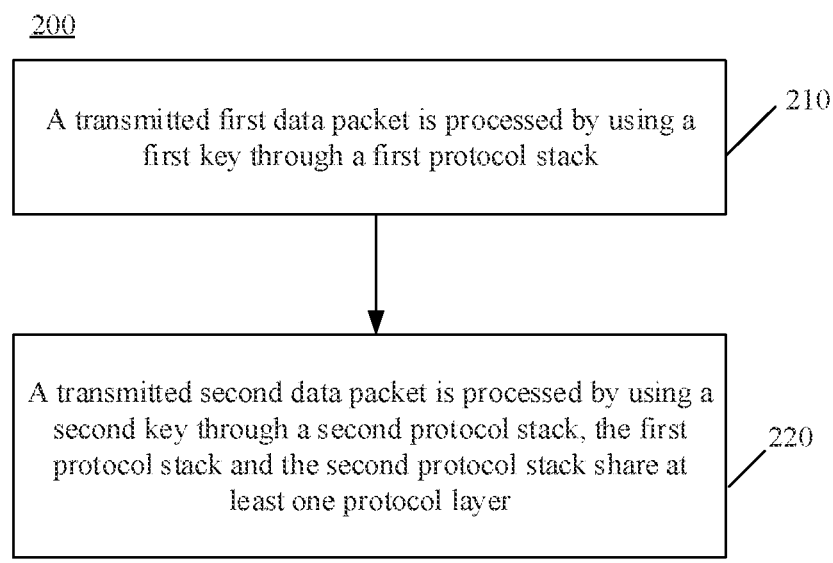
FIG. 4 is a schematic flowchart of a wireless communication method according to an embodiment of the disclosure.

FIG. 4 is a schematic flowchart of a wireless communication method 200 according to an embodiment of the disclosure.

The method 200 of the embodiment of the disclosure may be implemented by a data packet sender and may also be implemented by a data packet receiver. In a case that the method is implemented by the data packet sender, processing performed on a data packet using a first key may be encryption and/or integrity protection. In a case that the method is implemented by the data packet receiver, processing performed on the data packet using the first key may be decryption and/or integrity verification.

The data packet sender may be a terminal device, and the data packet receiver may be a base station. Alternatively, the data packet sender may be a base station, and the data packet receiver may be a terminal device.

Each data packet mentioned in the embodiment of the disclosure may have a corresponding SN, and the SN may be an SN of a PDCP layer.

The method 200 may be applied to data transmission of the user plane and may be applied to data transmission of the control plane.

The data packet in the embodiment of the disclosure may be a data packet of the user plane, and in such case, a key configured to process the data packet may be an encryption key and may further include an integrity protection key. Alternatively, the data packet may also be an RRC message transmitted on a control plane, and in such case, the key for processing the data packet may include the encryption key and/or the integrity protection key.

In 210, a transmitted first data packet is processed by using a first key through a first protocol stack. The first protocol stack may include multiple protocol layers, and for example, may be a user-plane protocol stack and a control-plane protocol stack shown in FIG. 2.

In 220, a transmitted second data packet is processed by using a second key through a second protocol stack. The second protocol stack may include multiple protocol layers, and for example, may include the user-plane protocol stack and the control-plane protocol stack shown in FIG. 2. The first protocol stack and the second protocol stack share at least one protocol layer.

Optionally, in the embodiment of the disclosure, the first protocol stack and the second protocol stack may be the same protocol stack and may also be different protocol stacks.

Optionally, in the embodiment of the disclosure, the first key and the second key may be the same and may also be different.

Optionally, in the embodiment of the disclosure, the first data packet and the second data packet may be identical data packets (namely containing the same information) and may also be different data packets.

Optionally, in the embodiment of the disclosure, the first data packet and the second data packet may belong to the same data flow.

Specifically, the first protocol stack and the second protocol stack share an SDPA or RRC layer, which can implement that the first data packet and the second data packet belong to the same data flow.

Optionally, in the embodiment of the disclosure, data packets in the same data flow are transmitted between a terminal device and multiple base stations.

Specifically, the first data packet is transmitted between the terminal device and a first base station through the first protocol stack, and the second data packet is transmitted between the terminal device and a second base station through the second protocol stack.

It is to be understood that, in the embodiment of the disclosure, the terminal device may also communicate with one base station by using at least two protocol stacks in the disclosure.

Figure 5:
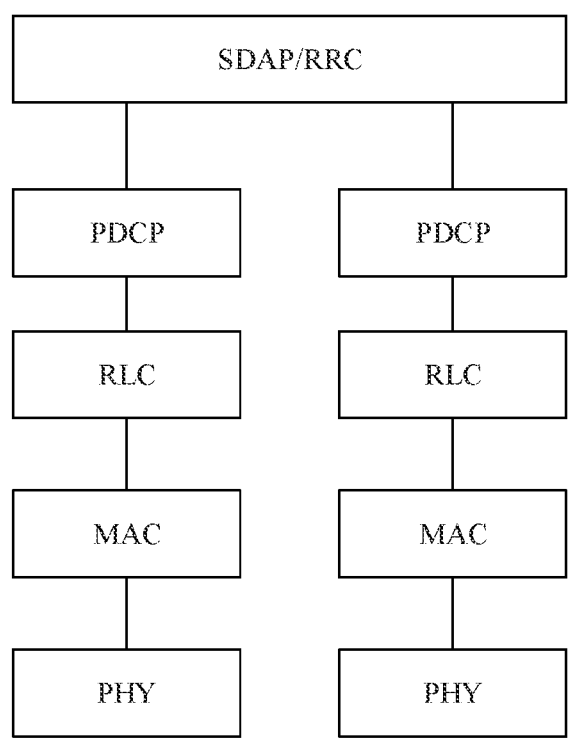
FIG. 5 is a schematic diagram of protocol layers shared by two protocol stacks according to an embodiment of the disclosure.

Optionally, in the embodiment of the disclosure, as shown in FIG. 5, the shared at least one protocol layer includes the SDAP layer or the RRC layer.

Optionally, in the embodiment of the disclosure, a protocol layer that is not shared by the first protocol stack and the second protocol stack may include the PDCP layer and may further include an RLC layer.

The RLC layer of data may contain an identifier, the identifier may indicate a protocol stack for processing the data packet, and the protocol stack may be an identifier of a radio bearer. Each protocol stack may be established when a radio bearer is established, and different protocol stacks may correspond to identifiers of different radio bearers.

Besides the PDCP layer and the RLC layer, the first protocol stack and the second protocol stack may also not share a MAC layer and/or a physical layer. Of course, the first protocol stack and the second protocol stack may also share the MAC layer and/or the physical layer.

Optionally, in the embodiment of the disclosure, time for processing the first data packet sent to the receiver by using the first key through the first protocol stack and time for processing the second data packet sent to the receiver by using the second key through the second protocol stack may at least partially overlap. Therefore, time interruption of data packet transmission may be avoided.

For example, there is a data packet 1, a data packet 2, a data packet 3, a data packet 4, a data packet 5 and a data packet 6. The data packet 1, the data packet 2 and the data packet 3 may be processed by using the first key through the first protocol stack, the data packet 4, the data packet 5 and the data packet 6 may be processed by using the second key through the second protocol stack, and time for processing the data packet 6 and time for processing the data packet 3 may overlap. Herein, processing on the data packet 3 may be retransmission processing and may also be first transmission processing.

Of course, there may also be no overlapping part between the time for processing the first data packet sent to the receiver by using the first key through the first protocol stack and the time for processing the second data packet sent to the receiver by using the second key through the second protocol stack.

Optionally, in the embodiment of the disclosure, the first key is a key before updating, and the second key is an updated key.

The second key may be obtained by updating based on the first key, and may also be obtained based on a parameter unrelated to the first key.

Figure 6:
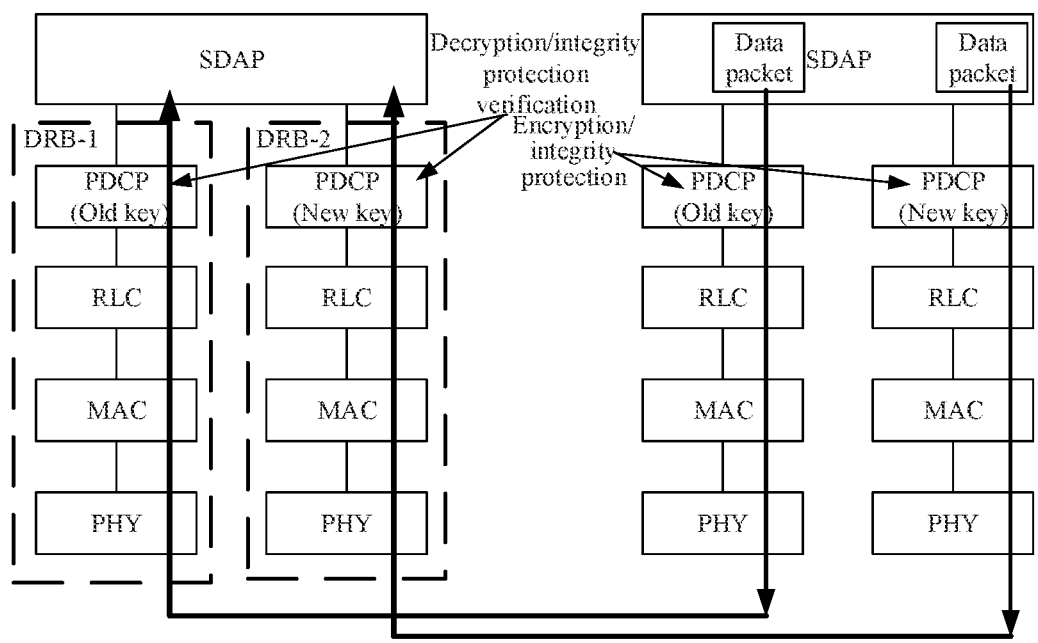
FIG. 6 is a schematic diagram of data packet transmission of two protocol stacks according to an embodiment of the disclosure.

For example, as shown in FIG. 6, two protocol stacks are established at the data packet sender and the data packet receiver through a DRB-1 and a DRB-2, the protocol stack established through the DRB-1 implements data packet transmission by using an old key, and the protocol stack established through the DRB-2 implements data packet transmission by using a new key.

Optionally, in the embodiment of the disclosure, the first protocol stack and the second protocol stack may be established at the same time and may also be established at different time. For example, the second protocol stack may be established after the first protocol stack is established.

For understanding the disclosure more clearly, how to process the second data packet by using the second key through the second protocol stack will be introduced below.

In an implementation mode, under a condition that an SN of data transmitted between the sender and the receiver reaches a preset value, the second data packet is processed by using the second key through the second protocol stack. In such case, the second protocol stack may be pre-established.

Specifically, for the sender, under a condition that an SN of sent data reaches the preset value, the second data packet may be processed by using the second key through the second protocol stack.

For the receiver, under a condition that an SN of received data reaches the preset value, the second data packet may be processed by using the second key through the second protocol stack.

The preset value mentioned here may be a maximum value of the SN, and may be a maximum value under which the key is required to be changed. The preset value may also be another value, and for example, may be a value close to the maximum value of the SN.

In an implementation mode, under a condition that an SN of a data packet transmitted between the sender and the receiver reaches the preset value, the second protocol stack is established between the sender and the receiver.

Specifically, for the sender, under a condition that an SN of a sent data packet reaches the preset value, the second protocol stack may be established between the data packet sender and receiver, and after the second protocol stack is established, the second data packet may be processed by using the second key. The second key may be generated before the second protocol stack is established, may also be generated in a process of establishing the second protocol stack, and may also be generated after the second protocol stack is established.

In an implementation mode, establishment of the first protocol stack is triggered through a first message. The first message may be sent by the data packet sender. For example, the data packet sender, responsive to determining that the SN of the transmitted data packet reaches the preset value, may send the first message to trigger establishment of the second protocol stack between the data packet sender and the data packet receiver. Alternatively, the first message may also be sent by the data packet receiver. For example, the data packet receiver, responsive to finding that an SN of a received data packet reaches the preset value, may send the first message to trigger establishment of the second protocol stack between the data packet sender and the data packet receiver. Alternatively, the first message may be sent by a base station, and in such case, the base station may be the data packet sender and may also be the data packet receiver. After the second protocol stack is established, the second data packet may be processed by using the second key. The second key may be generated before the second protocol stack is established, may also be generated in the process of establishing the second protocol stack and may also be generated after the second protocol stack is established.

In an implementation mode, processing onto the second data by using the second key through the second protocol stack is triggered by the first message.

The first message may be sent by the data packet sender. For example, the data packet sender, responsive to determining that the SN of the transmitted data packet reaches the preset value, may send the first message to trigger the data packet receiver to process the second data packet by using the second key through the second protocol stack. Alternatively, the first message may also be sent by the data packet receiver. For example, the data packet receiver, responsive to finding that the SN of the received data packet reaches the preset value, may send the first message to trigger the data packet sender to process the second data packet by using the second key through the second protocol stack. Alternatively, the first message may be sent by the base station, and in such case, the base station may be the data packet sender and may also be the data packet receiver. In such case, the second protocol stack may be established before the first message is transmitted, and the second key may also be generated before the first message is transmitted. Through the implementation mode, interruption of data packet transmission may be avoided, but it is to be understood that the disclosure is not limited thereto.

In an implementation mode, changing of a key for processing the data packet is triggered through the first message. The first message may contain the second key and may also contain a parameter configured to generate the second key based on the first key, or, the first message is only used for triggering, which is not limited in the embodiment of the application.

The first message may be sent by the data packet sender. For example, the data packet sender, responsive to determining that the SN of the transmitted data packet reaches the preset value, may send the first message to trigger the data packet receiver to update the key for processing the data packet, and the data packet sender synchronously updates the key. Alternatively, the first message may also be sent by the data packet receiver. For example, the data packet receiver, responsive to finding that the SN of the received data packet reaches the preset value, may send the first message to trigger the data packet sender to update the key for processing the data packet, and the data packet receiver synchronously updates the key. Alternatively, the first message may be sent by the base station, and in such case, the base station may be the data packet sender and may also be the data packet receiver. In such case, the second protocol stack may be established before the first message is transmitted and may also be established while the key is updated, but it is to be understood that the disclosure is not limited thereto.

Optionally, in the embodiment of the disclosure, the processing onto the data packet by using the first key through the first protocol stack may be omitted. When the processing onto the data packet by using the first key through the first protocol stack may be omitted, the operation of processing the data packet by using the second key through the second protocol stack is executed or to be executed.

Specifically, the processing onto the data packet by using the first key through the first protocol stack may be omitted when at least one of the following conditions is met.

Transmission of data required to be transmitted by using the key before updating is completed, generation of the updated key is completed, and establishment of the second protocol stack is completed.

Transmission of the data required to be transmitted by using the key before updating being completed refers to that retransmission is not required or retransmission is completed.

Optionally, in the embodiment of the disclosure, under a condition that the processing onto the data packet by using the first key through the first protocol stack may be omitted, the data packet sender may send a second message to the data packet receiver, and the data packet receiver may process the data packet through the second protocol stack without using the first key.

The second message may contain an SN of a last data packet processed by the first key or an SN of a first data packet processed by the second key. In such case, the data packet receiver may determine which data packet is required to be processed by using the second key and the second protocol stack.

Optionally, in the embodiment of the disclosure, the first message and the second message may be control-plane messages, and of course, may also be user-plane messages, which is not limited in the embodiment of the disclosure.

It is to be understood that, when the key is required to be updated under the abovementioned conditions, the data packet is processed by using a new key through the second protocol stack. However, it is to be understood that the embodiment of the disclosure is not limited thereto. The embodiment of the disclosure is not limited to a scenario for key updating. For example, the first key as well as the second key and the first protocol stack as well as the second protocol stack may be concurrently used. For example, a data packet is transmitted by using the first key through the first protocol stack, and the data packet is repeatedly transmitted by using the second key through the second protocol stack. Therefore, reliability of transmission of the data packet may be ensured. In such case, SNs (carried in the PDCP layer) of the data packets transmitted through the first protocol stack and the second protocol stack may be the same.

Accordingly, in the embodiment of the disclosure, the first data packet and the second data packet are processed through the first protocol stack and the second protocol stack respectively, and whether the first key or the second key is used for the data packet may be identified through the adopted protocol stack, so that the data packet receiver and the data packet sender may process the data packet by using the same key, thereby avoiding a data packet transmission failure or decryption failure.

FIG. 7 is a schematic flowchart of a wireless communication method 300 according to an embodiment of the disclosure. The method 300 includes at least part of contents in the following contents.

A data packet sender mentioned below may be a terminal device, and a data packet receiver may be a base station. Alternatively, the data packet sender may be a base station, and the data packet receiver may be a terminal device.

At the data packet sender, processing performed on a data packet by using a first key may be encryption and/or integrity protection. At the data packet receiver, processing performed on the data packet by using the first key may be decryption and/or integrity verification.

Each data packet mentioned in the embodiment of the disclosure may correspond to an SN, and the SN may be an SN of a PDCP layer.

The method 300 may be applied to data transmission in the user plane and may be applied to data transmission in the control plane.

The data packet in the embodiment of the disclosure may be a data packet in the user plane, and in such case, a key for processing the data packet may be an encryption key and may further include an integrity protection key. Alternatively, the data packet may also be an RRC message transmitted on a control plane, and in such case, the key for processing the data packet may include the encryption key and/or the integrity protection key.

In 310, a data packet sender sends a first identifier to a data packet receiver. The first identifier is used to distinguish data packets processed by using a first key and a second key.

Optionally, in the embodiment of the disclosure, the first identifier is added into last at least one data packet processed by using the first key; and/or the first identifier is added into first at least one data packet processed by using the second key.

The first identifier may be added into last multiple data packets processed by using the first key, and/or the first identifier is added into first multiple data packets processed by using the second key, thereby avoiding the problem of transmission failure of the first identifier due to data packet loss.

The data packet carrying the first identifier may carry only the first identifier and may also contain data to be transmitted.

Optionally, in the embodiment of the disclosure, the first identifier is carried in an independent data packet. The independent data packet may optionally be dedicated to carrying the first identifier and does not carry no other data.

Figure 8:
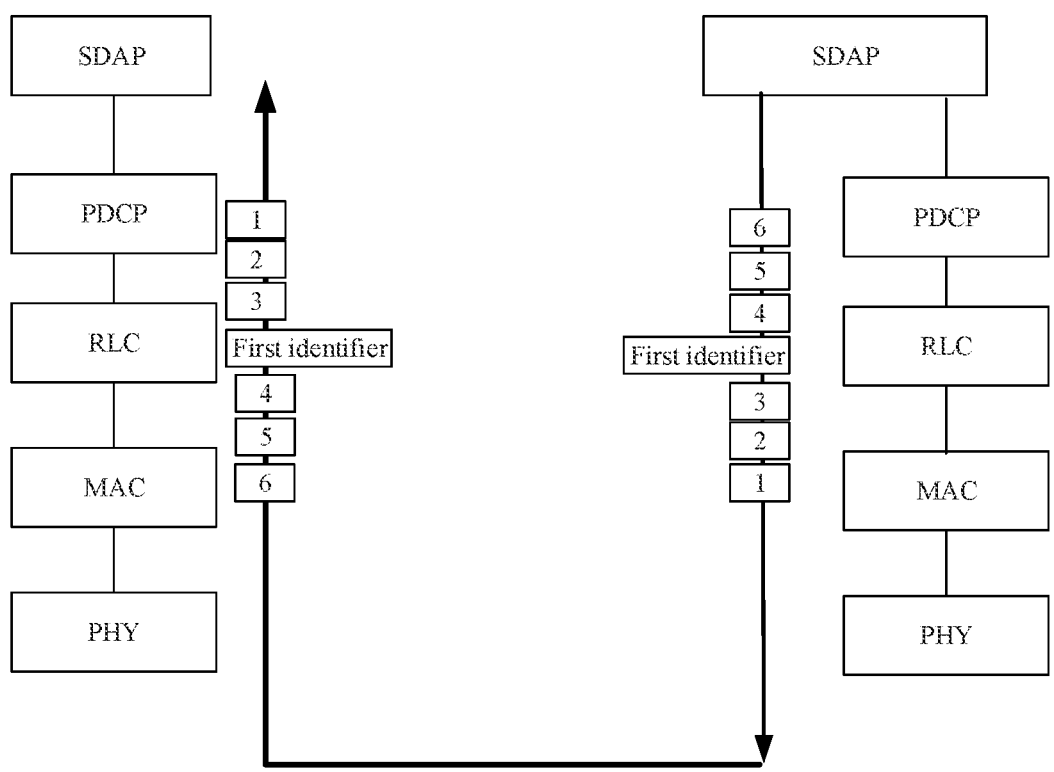
FIG. 8 is a schematic diagram of transmitting a data packet and an identifier according to an embodiment of the disclosure.

For example, as shown in FIG. 8, the data packet sender and receiver may transmit a data packet 1, a data packet 2, a data packet 3, a data packet 4, a data packet 5 and a data packet 6, and the first identifier may be transmitted through an independent data packet between the data packet 3 and the data packet 4. The data packets 1, 2 and 3 may be processed by using the first key, and the data packets 4, 5 and 6 may be processed by using the second key.

The independent data packet is between a last data packet processed by using the first key and a first data packet processed by using the second key.

Optionally, in the embodiment of the disclosure, the first key is a key before updating, and the second key is an updated key.

The second key may be obtained by updating based on the first key, and may also be obtained through a parameter unrelated to the first key.

Optionally, in the embodiment of the disclosure, the first key and the second key are used for performing encryption and/or integrity protection operations on the data packets in a PDCP layer. The first key and the second key may be for different data packets respectively.

Optionally, in the embodiment of the disclosure, the first identifier is carried in a header of at least one layer of the data packet. The at least one layer includes the PDCP layer, and of course, may also include another protocol layer, which is not limited in the embodiment of the application.

Optionally, in the embodiment of the disclosure, the data packet processed by using the first key and the data packet processed by using the second key are transmitted through the same protocol stack.

The data packets processed by using the first key and the second key are distinguished through the first identifier, and it is unnecessary to distinguish the data packets processed by using the first key and the second key through protocol stacks, thereby simplifying establishment of the protocol stack, and simplifying the communication complexity.

Optionally, in the embodiment of the disclosure, under a condition that an SN of a data packet transmitted between the data packet sender and the data packet receiver reaches a preset value, the data packet sender sends the first identifier. The preset value may be a maximum value of the SN, and may also be a value close to the maximum value. Therefore, when the SN reaches the maximum value and the key is required to be updated, the key may be updated.

Accordingly, in the embodiment of the disclosure, the data packet sender sends the first identifier to the data packet receiver, the first identifier is configured to distinguish the data packets processed by using the first key and the second key, so that the data packet receiver and the data packet sender may process the data packet by using the same key, thereby avoiding data packet transmission failure or decryption failure.

FIG. 9 is a schematic flowchart of a wireless communication method 400 according to an embodiment of the disclosure. The method 400 includes at least part of contents in the following contents.

In 410, a data packet receiver receives a first identifier sent by a data packet sender. The first identifier is configured to distinguish data packets processed by using a first key and a second key.

Optionally, in the embodiment of the disclosure, the first identifier is added into last at least one data packet processed by using the first key and/or, the first identifier is added into first at least one data packet processed by using the second key.

Optionally, in the embodiment of the disclosure, the first identifier is carried in an independent data packet.

Optionally, in the embodiment of the disclosure, the independent data packet is between a last data packet processed by using the first key and a first data packet processed by using the second key.

Optionally, in the embodiment of the disclosure, the first key is a key before updating, and the second key is an updated key.

Optionally, in the embodiment of the disclosure, the first key and the second key are used for performing encryption and/or integrity protection operations on the data packets in a PDCP layer.

Optionally, in the embodiment of the disclosure, the first identifier is carried in a header of at least one layer of the data packet.

Optionally, in the embodiment of the disclosure, the at least one layer includes the PDCP layer.

Optionally, in the embodiment of the disclosure, the method further includes the following operation.

The data packet processed by using the first key and the data packet processed by using the second key are transmitted through the same protocol stack.

Optionally, in the embodiment of the disclosure, the data packet sender is a terminal device, and the data packet receiver is a base station. Alternatively, the data packet sender is A base station, and the data packet receiver is A terminal device.

It is to be understood that specific implementation of the method 400 may refer to descriptions in the method 300, which is not described repeatedly here anymore for simplicity.

Figure 10:
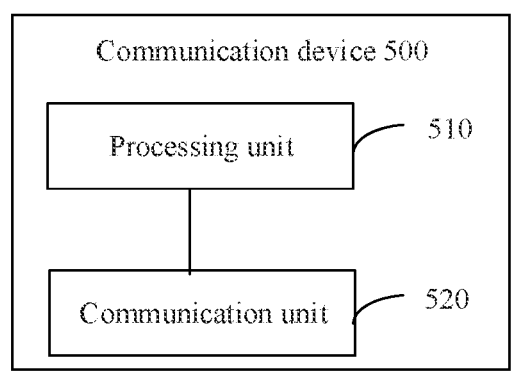
FIG. 10 is a schematic block diagram of a communication device according to an embodiment of the disclosure.

FIG. 10 is a schematic block diagram of a communication device 500 according to an embodiment of the disclosure. The communication device 500 may be a data packet sender and may also be a data packet receiver. The communication device 500 includes a processing unit 510.

The processing unit is configured to process a transmitted first data packet by using a first key through a first protocol stack; and process a transmitted second data packet by using a second key through a second protocol stack.

The first protocol stack and the second protocol stack share at least one protocol layer.

Optionally, in the embodiment of the disclosure, the shared at least one protocol layer includes an SDAP layer or an RRC layer.

Optionally, in the embodiment of the disclosure, a protocol layer that is not shared by the first protocol stack and the second protocol stack includes a PDCP layer.

Optionally, in the embodiment of the disclosure, the protocol layer that is not shared by the first protocol stack and the second protocol stack further includes an RLC layer.

Optionally, in the embodiment of the disclosure, the protocol layer that is not shared by the first protocol stack and the second protocol stack further includes a MAC layer and a PHY layer.

Optionally, in the embodiment of the disclosure, the processing unit 510 is further configured to, under a condition that an SN of a transmitted data packet reaches a preset value, process the second data packet by using the second key through the second protocol stack.

Optionally, in the embodiment of the disclosure, the processing unit 510 is further configured to: under a condition that the SN of the transmitted data packet reaches the preset value, establish the second protocol stack.

Optionally, in the embodiment of the disclosure, as shown in FIG. 10, the device 500 further includes a communication unit 520, configured to receive or send a first message. The first message is configured to trigger establishment of the second protocol stack.

Optionally, in the embodiment of the disclosure, as shown in FIG. 10, the device 500 further includes the communication unit 520, configured to receive or send the first message. The first message is configured to trigger the second data packet to be processed by using the second key through the second protocol stack.

Optionally, in the embodiment of the disclosure, as shown in FIG. 10, the device 500 further includes the communication unit 520, configured to: receive or send the first message. The first message is configured to trigger changing of a key for processing the data packet.

Optionally, in the embodiment of the disclosure, the first message is sent when the SN of the transmitted data packet reaches the preset value.

Optionally, in the embodiment of the disclosure, the first key is a key before updating, and the second key is an updated key.

Optionally, in the embodiment of the disclosure, the processing unit 510 is further configured to omit processing the data packet by using the first key through the first protocol stack.

Optionally, in the embodiment of the disclosure, the processing unit 510 is further configured to: omit the processing the data packet by using the first key through the first protocol stack when at least one of the following conditions is met.

Transmission of a data packet required to be transmitted by using the key before updating is completed, generation of the updated key is completed, and establishment of the second protocol stack is completed.

Optionally, in the embodiment of the disclosure, as shown in FIG. 10, the device 500 further includes the communication unit 520 configured to send or receive a second message. The second message is configured to indicate that the data packet is no longer processed through the first protocol stack.

Optionally, in the embodiment of the disclosure, the data packet sender is a terminal device, and the data packet receiver is a base station; alternatively, the data packet sender is a base station, and the data packet receiver is a terminal device.

Optionally, in the embodiment of the disclosure, the first data packet is transmitted between the terminal device and a first base station through the first protocol stack, and the second data packet is transmitted between the terminal device and a second base station by using the second protocol stack.

Optionally, in the embodiment of the disclosure, processing includes encryption and/or integrity protection processing.

Optionally, in the embodiment of the disclosure, processing unit is implemented in the PDCP layer.

It is to be understood that the communication device 500 may implement the operations in the method 200, and for example, may implement the operations of the data packet sender in the method 200 or implement the operations of the data packet receiver in the method 200, which is not described repeatedly here anymore.

Figure 11:
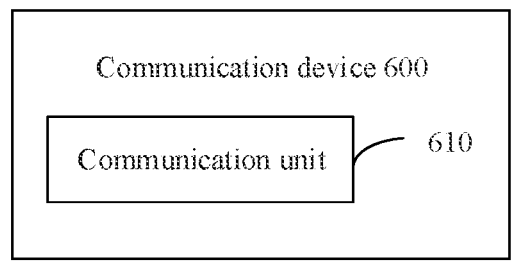
FIG. 11 is a schematic block diagram of a communication device according to an embodiment of the disclosure.

FIG. 11 is a schematic block diagram of a communication device 600 according to an embodiment of the disclosure. The communication device 600 is a data packet sender, and includes a communication unit 610, which is configured to, send a first identifier to a data packet receiver. The first identifier is configured to distinguish data packets processed by using a first key and a second key.

Optionally, in the embodiment of the disclosure, the first identifier is added into last at least one data packet processed by using the first key; and/or, the first identifier is added into first at least one data packet processed by using the second key.

Optionally, in the embodiment of the disclosure, the first identifier is carried in an independent data packet.

Optionally, in the embodiment of the disclosure, the independent data packet is between a last data packet processed by using the first key and a first data packet processed by using the second key.

Optionally, in the embodiment of the disclosure, the first key is a key before updating, and the second key is an updated key.

Optionally, in the embodiment of the disclosure, the first key and the second key are used for performing encryption and/or integrity protection operations on the data packets in a PDCP layer.

Optionally, in the embodiment of the disclosure, the first identifier is carried in a header of at least one layer of the data packet.

Optionally, in the embodiment of the disclosure, the at least one layer includes the PDCP layer.

Optionally, in the embodiment of the disclosure, the communication unit 610 is further configured to: transmit the data packet processed by using the first key and the data packet processed by using the second key through the same protocol stack.

Optionally, in the embodiment of the disclosure, the communication unit 610 is further configured to: under a condition that an SN of a data packet transmitted between the data packet sender and the data packet receiver reaches a preset value, send the first identifier.

Optionally, in the embodiment of the disclosure, the data packet sender is a terminal device, and the data packet receiver is a base station; alternatively, the data packet sender is a base station, and the data packet receiver is a terminal device.

It is to be understood that the communication device 600 may implement the operations in the method 3), and for example, may implement the operations of the data packet sender in the method 300, which is not described repeatedly here anymore for simplicity.

Figure 12:
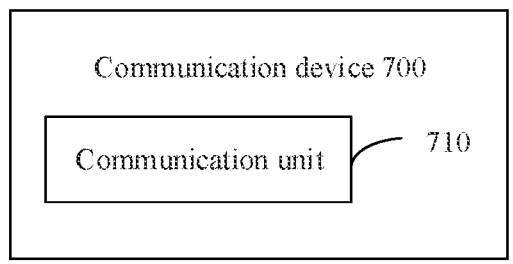
FIG. 12 is a schematic block diagram of a communication device according to an embodiment of the disclosure.

FIG. 12 is a schematic block diagram of a communication device 700 according to an embodiment of the disclosure. The communication device is a data packet receiver, and includes a communication unit 710, which is configured to: receive a first identifier sent by a data packet sender. The first identifier is configured to distinguish data packets processed by using a first key and a second key.

Optionally, in the embodiment of the disclosure, the first identifier is added into last at least one data packet processed by using the first key; and/or the first identifier is added into first at least one data packet processed by using the second key.

Optionally, in the embodiment of the disclosure, the first identifier is carried in an independent data packet.

Optionally, in the embodiment of the disclosure, the independent data packet is between a last data packet processed by using the first key and a first data packet processed by using the second key.

Optionally, in the embodiment of the disclosure, the first key is a key before updating, and the second key is an updated key.

Optionally, in the embodiment of the disclosure, the first key and the second key are used for performing encryption and/or integrity protection operations on the data packets in a PDCP layer.

Optionally, in the embodiment of the disclosure, the first identifier is carried in a header of at least one layer of the data packet.

Optionally, in the embodiment of the disclosure, the at least one layer includes the PDCP layer.

Optionally, in the embodiment of the disclosure, the communication unit 710 is further configured to: transmit the data packet processed by using the first key and the data packet processed by using the second key through the same protocol stack.

Optionally, in the embodiment of the disclosure, the data packet sender is a terminal device, and the data packet receiver is a base station, alternatively, the data packet sender is a base station, and the data packet receiver is a terminal device.

It is to be understood that the communication device 700 may implement the operations in the method 400, and for example, may implement the operations of the data packet receiver in the method 400, which is not described repeatedly here anymore for simplicity.

Figure 13:
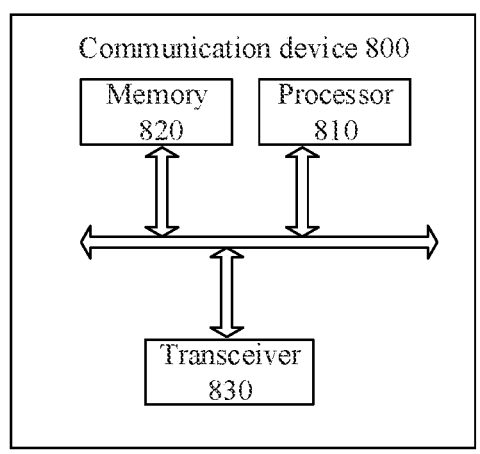
FIG. 13 is a schematic block diagram of a communication device according to an embodiment of the disclosure.

FIG. 13 is a schematic structure diagram of a communication device 800 according to an embodiment of the disclosure. The communication device 800 shown in FIG. 13 includes a processor 810, and the processor 810 may call and run a computer program in a memory to implement the method in the embodiments of the disclosure.

Optionally, as shown in FIG. 13, the communication device 800 may further include a memory 820. The processor 810 may call and run the computer program in the memory 820 to implement the method in the embodiments of the disclosure.

The memory 820 may be a separate device independent of the processor 810 and may also be integrated into the processor 810.

Optionally, as shown in FIG. 13, the communication device 800 may further include a transceiver 830, and the processor 810 may control the transceiver 830 to communicate with another device, specifically sending information or data to the other device or receiving information or data sent by the other device.

The transceiver 830 may include a transmitter and a receiver. The transceiver 830 may further include an antenna, and the number of antennas may be one or more.

Optionally, the communication device 800 may specifically be the network device of the embodiments of the disclosure, and the communication device 800 may implement corresponding flows implemented by the network device in each method of the embodiments of the disclosure, which is not described repeatedly here anymore for simplicity.

Optionally, the communication device 800 may specifically be the data packet sender or receiver of the embodiments of the disclosure, and the communication device 800 may implement corresponding flows implemented by the data packet sender or receiver in each method of the embodiments of the disclosure, which is not described repeatedly here anymore for simplicity.

Figure 14:
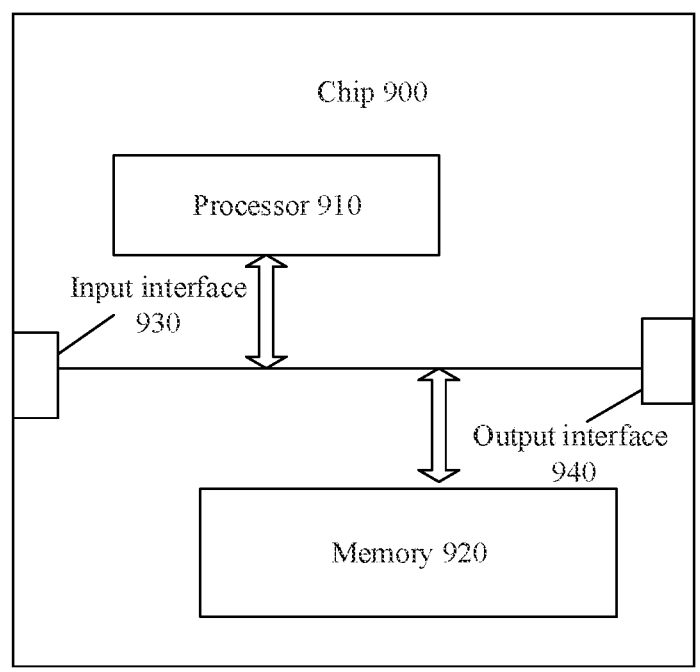
FIG. 14 is a schematic block diagram of a chip according to an embodiment of the disclosure.

FIG. 14 is a schematic structure diagram of a chip according to an embodiment of the disclosure. The chip 900 shown in FIG. 14 includes a processor 910, and the processor 910 may call and run a computer program in a memory to implement the method in the embodiments of the disclosure.

Optionally, as shown in FIG. 14, the chip 900 may further include a memory 920. The processor 910 may call and run the computer program in the memory 920 to implement the method in the embodiments of the disclosure.

The memory 920 may be a separate device independent of the processor 910 and may also be integrated into the processor 910.

Optionally, the chip 900 may further include an input interface 930. The processor 910 may control the input interface 930 to communicate with another device or chip, specifically acquiring information or data sent by the other device or chip.

Optionally, the chip 900 may further include an output interface 940. The processor 910 may control the output interface 940 to communicate with the other device or chip, specifically outputting information or data to the other device or chip.

Optionally, the chip may be applied to the data packet sender or receiver in the embodiments of the disclosure, and the chip may implement corresponding flows implemented by the data packet sender or receiver in each method of the embodiments of the disclosure, which is not described repeatedly here anymore for simplicity.

It is to be understood that the chip mentioned in the embodiment of the disclosure may also be called a system-level chip, a system chip, a chip system or a system on chip, etc.

Figure 15:
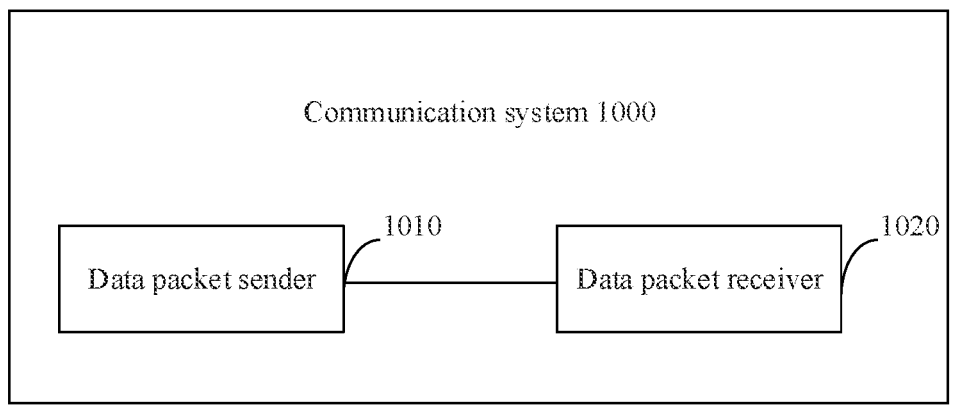
FIG. 15 is a schematic block diagram of a communication system according to an embodiment of the disclosure.

FIG. 15 is a second block diagram of a communication system 1000 according to an embodiment of the disclosure. As shown in FIG. 15, the communication system 1000 includes a data packet sender 1010 and a data packet receiver 1020.

The data packet sender 1010 may be configured to implement corresponding functions realized by the data packet sender in the above methods, and the data packet receiver 1020 may be configured to implement corresponding functions realized by the data packet receiver in the above methods, which is not described repeatedly here anymore for simplicity.

It is to be understood that the processor in the embodiment of the disclosure may be an integrated circuit chip and has a signal processing capacity. In an implementation process, each step of the above method embodiments may be implemented by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be arranged in a mature storage medium in this field such as a Random Access Memory (RAM), a flash memory, a Read-Only Memory (ROM), a Programmable ROM (PROM) or Electrically Erasable PROM (EEPROM) and a register. The storage medium is arranged in a memory, and the processor reads information in the memory, and implements the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an Electrically EEPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but is not limited to, memories of these and any other proper types.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but is not limited to, memories of these and any other proper types.

The embodiments of the disclosure further provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure, which is not described repeatedly here anymore for simplicity.

Optionally, the computer-readable storage medium may be applied to a mobile terminal/terminal device in the embodiments of the disclosure, and the computer program enables a computer to execute corresponding flows implemented by the mobile terminal/terminal device in each method of the embodiments of the disclosure, which is not described repeatedly here anymore for simplicity.

The embodiments of disclosure application further provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure, which is not described repeatedly here anymore for simplicity.

Optionally, the computer program product may be applied to a mobile terminal/terminal device in the embodiments of the disclosure, and the computer program instruction enables the computer to execute corresponding flows implemented by the mobile terminal/terminal device in each method of the embodiments of the disclosure, which is not described repeatedly here anymore for simplicity.

The embodiments of the disclosure further provide a computer program.

Optionally, the computer program may be applied to a network device in the embodiments of the disclosure, and the computer program runs in a computer to enable the computer to execute corresponding flows implemented by the network device in each method of the embodiments of the disclosure, which is not described repeatedly here anymore for simplicity.

Optionally, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure, which is not described repeatedly here anymore for simplicity.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by using different methods, but such realization shall fall within the scope of the application.

Those skilled in the art may clearly learn about that for specific operations processes of the system, device and unit described above, reference may be made to the corresponding processes in the above method embodiment, and the specific operations are not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, displayed or discussed coupling or direct coupling or communication connection may be indirect coupling or communication connection, implemented through some interfaces, device or units, and may be electrical and mechanical or adopt other forms.

The units described as separate parts may or may not be physically separated, and parts displayed as units may or may not be PHY units, that is, the parts may be arranged in the same place, or may also be distributed to multiple network units. Part or all of the units may be selected to achieve the purpose of the solutions of the embodiments according to a practical requirement.

In addition, functional units in each embodiment of the disclosure may be integrated into a processing unit, each unit may also physically exist independently, and two or more than two units may also be integrated into a unit.

When being implemented in form of software functional unit and sold or used as an independent product, the function may also be stored in a computer-readable storage medium. Based on such an understanding, an essential part of the technical solutions in the disclosure, a part of the technical solutions making contributions to the prior art, or a part of the technical solutions may be embodied in a form of a software product. The computer software product is stored in a storage medium and includes several instructions configured to enable a computer device (which may be a personal computer, a server, a network device or the like) to execute all or a part of the operations of the method in each embodiment of the disclosure. The above-mentioned storage medium includes: various media capable of storing program codes such as a U disk, a mobile hard disk, a Read-Only Memory (ROM), a Random Access Memory (RAM), a magnetic disk and an optical disk.

The foregoing is only the specific embodiments of the disclosure, and the scope of protection of the disclosure is not limited thereto. Any variations or replacements easily appreciated by those skilled in the art within the technical scope disclosed by the disclosure shall fall within the scope of protection of the disclosure. Therefore, the scope of protection of the disclosure shall conform to the scope of protection of the claims.

The invention claimed is:

1. A wireless communication method, comprising:
processing a transmitted first data packet by using a first key through a first protocol stack; and
processing a transmitted second data packet by using a second key through a second protocol stack,
wherein the first protocol stack and the second protocol stack share at least one protocol layer, and the first data packet is transmitted between a terminal device and a first base station through the first protocol stack, and the second data packet is transmitted between the terminal device and a second base station through the second protocol stack,
wherein the first key as well as the second key and the first protocol stack as well as the second protocol stack are concurrently used, and time for processing the first data packet sent to the receiver by using the first key through the first protocol stack and time for processing the second data packet sent to the receiver by using the second key through the second protocol stack at least partially overlap, wherein the method further comprises: receiving or sending a first message, wherein the first message is configured to trigger processing the second data packet by using the second key through the second protocol stack.

2. The method of claim 1, wherein a protocol layer which is not shared by the first protocol stack and the second protocol stack comprises a Radio Link Control (RLC) layer.

3. The method of claim 1, wherein the first key is a key before updating, and the second key is an updated key.

4. The method of claim 1, further comprising:
receiving or sending a second message, wherein the second message is configured to indicate that the data packet is no longer processed by using the first key through the first protocol stack.

5. The method of claim 1, wherein a data packet sender is a terminal device, and a data packet receiver is a base station; or,
the data packet sender is a base station, and the data packet receiver is a terminal device.

6. The method of claim 1, wherein the processing comprises at least one of encryption or integrity protection processing.

7. The method of claim 1, wherein the processing is implemented in a Packet Data Convergence Protocol (PDCP) layer.

8. A communication device, comprising a processor and a memory, wherein the memory is configured to store a computer program, and the processor is configured to call and run the computer program stored in the memory to:
process a transmitted first data packet by using a first key through a first protocol stack; and
process a transmitted second data packet by using a second key through a second protocol stack,
wherein the first protocol stack and the second protocol stack share at least one protocol layer, and the first data packet is transmitted between a terminal device and a first base station through the first protocol stack, and the second data packet is transmitted between the terminal device and a second base station through the second protocol stack, and
wherein the first key as well as the second key and the first protocol stack as well as the second protocol stack are concurrently used, and time for processing the first data packet sent to the receiver by using the first key through the first protocol stack and time for processing the second data packet sent to the receiver by using the second key through the second protocol stack at least partially overlap,
wherein the device further comprises a transceiver configured to receive or send a first message, wherein the first message is configured to trigger processing the second data packet by using the second key through the second protocol stack.

9. The device of claim 8, wherein a protocol layer which is not shared by the first protocol stack and the second protocol stack comprises a Radio Link Control (RLC) layer.

10. The device of claim 8, wherein the first key is a key before updating, and the second key is an updated key.

11. The device of claim 8, further comprising a transceiver, configured to:
receive or send a second message, wherein the second message is configured to indicate that the data packet is no longer processed by using the first key through the first protocol stack.

12. The device of claim 8, wherein a data packet sender is a terminal device, and a data packet receiver is a base station; or
the data packet sender is a base station, and the data packet receiver is a terminal device.

13. The device of claim 8, wherein the processing comprises at least one of encryption or integrity protection processing.

14. The device of claim 8, wherein the processing is implemented in a Packet Data Convergence Protocol (PDCP) layer.

* * * * *